US010948810B2

(12) United States Patent
Miyazaki

(10) Patent No.: US 10,948,810 B2
(45) Date of Patent: Mar. 16, 2021

(54) PROJECTION-TYPE IMAGE DISPLAY APPARATUS, FILTER APPARATUS, CONTROL APPARATUS, AND CONTROL METHOD

(71) Applicant: SONY CORPORATION, Tokyo (JP)

(72) Inventor: Akihiro Miyazaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/326,997

(22) PCT Filed: Aug. 3, 2017

(86) PCT No.: PCT/JP2017/028195
§ 371 (c)(1),
(2) Date: Feb. 21, 2019

(87) PCT Pub. No.: WO2018/051666
PCT Pub. Date: Mar. 22, 2018

(65) Prior Publication Data
US 2019/0199960 A1   Jun. 27, 2019

(30) Foreign Application Priority Data

Sep. 15, 2016   (JP) .............................. JP2016-180514

(51) Int. Cl.
*G03B 21/16*   (2006.01)
*H04N 9/31*   (2006.01)
(Continued)

(52) U.S. Cl.
CPC ........... *G03B 21/16* (2013.01); *G03B 21/145* (2013.01); *H04N 9/3144* (2013.01); *G03B 21/14* (2013.01); *H04N 5/2254* (2013.01); *H04N 5/74* (2013.01)

(58) Field of Classification Search
CPC .............................. G03B 21/16; H04N 9/3144
See application file for complete search history.

(56) References Cited

U.S. PATENT DOCUMENTS 4,792,344 A * 12/1988 Belcher .............. B01D 46/0075
55/299
5,681,363 A * 10/1997 Tucker ...................... A47L 9/20
55/293
(Continued)

FOREIGN PATENT DOCUMENTS

CN   1289265 A   3/2001
CN   102284219 A   12/2011
(Continued)

OTHER PUBLICATIONS

International Search Report and Written Opinion of PCT Application No. PCT/JP2017/028195, dated Oct. 24, 2017, 07 pages of English Translation and 07 pages of ISRWO.
(Continued)

*Primary Examiner* — Bao-Luan Q Le
(74) *Attorney, Agent, or Firm* — Chip Law Group

(57) ABSTRACT

Provided is a projection-type image display apparatus in which dust collected on a filter can be removed more efficiently. The projection-type image display apparatus includes an image projection section configured to generate and project an image, a cabinet section that houses the image projection section in an interior and is provided with at least one or more air inlets, a passage section through which outside air taken in from the air inlet flows, a filter section provided in the passage section, an impact application section that strikes the filter section, and a control section that controls the impact application section so as to strike the filter section at a timing when the filter section vibrating by striking of the impact application section is moving toward the impact application section.

13 Claims, 13 Drawing Sheets

(51) Int. Cl.
*G03B 21/14* (2006.01)
*H04N 5/74* (2006.01)
*H04N 5/225* (2006.01)

(56) References Cited

U.S. PATENT DOCUMENTS

| | | | | |
|---|---|---|---|---|
| 6,117,200 | A * | 9/2000 | Berg | A47L 9/20 15/352 |
| 6,391,199 | B1 | 5/2002 | Diemer et al. | |
| 6,544,309 | B1 * | 4/2003 | Hoefer | H05K 7/20181 361/695 |
| 7,677,962 | B2 * | 3/2010 | Chang | H05K 7/20181 353/57 |
| 8,696,138 | B2 * | 4/2014 | Nishihata | B01D 46/0065 353/119 |
| 9,568,814 | B2 * | 2/2017 | Chen | G03B 21/16 |
| 2004/0227837 | A1 * | 11/2004 | Ito | H04N 5/2254 348/335 |
| 2005/0081495 | A1 * | 4/2005 | Wei | B01D 46/0065 55/290 |
| 2007/0000219 | A1 * | 1/2007 | Park | F24F 3/1603 55/300 |
| 2007/0085976 | A1 * | 4/2007 | Yang | G03B 21/18 353/57 |
| 2007/0207721 | A1 * | 9/2007 | Chang | H05K 7/20181 454/184 |
| 2009/0282641 | A1 * | 11/2009 | Black | A47L 11/4033 15/352 |
| 2011/0297000 | A1 * | 12/2011 | Kotani | B01D 46/0065 96/421 |
| 2012/0154762 | A1 * | 6/2012 | Nishihata | B01D 46/0065 353/58 |
| 2013/0169942 | A1 * | 7/2013 | Chen | G03B 21/16 353/61 |

FOREIGN PATENT DOCUMENTS

| | | |
|---|---|---|
| CN | 103197495 A | 7/2013 |
| DE | 19804494 A1 | 8/1999 |
| JP | 2002-502683 A | 1/2002 |
| JP | 2006-208720 A | 8/2006 |
| JP | 2010-019575 A | 1/2010 |
| JP | 2015-051391 A | 3/2015 |
| WO | 99/39803 A1 | 8/1999 |
| WO | 2015/182029 A1 | 12/2015 |

OTHER PUBLICATIONS

International Preliminary Report on Patentability of PCT Application No. PCT/JP2017/028195, dated Mar. 28, 2019, 07 pages of English Translation and 05 pages of IPRP.
Office Action for CN Patent Application No. 201780054888, dated Sep. 30, 2020.

* cited by examiner

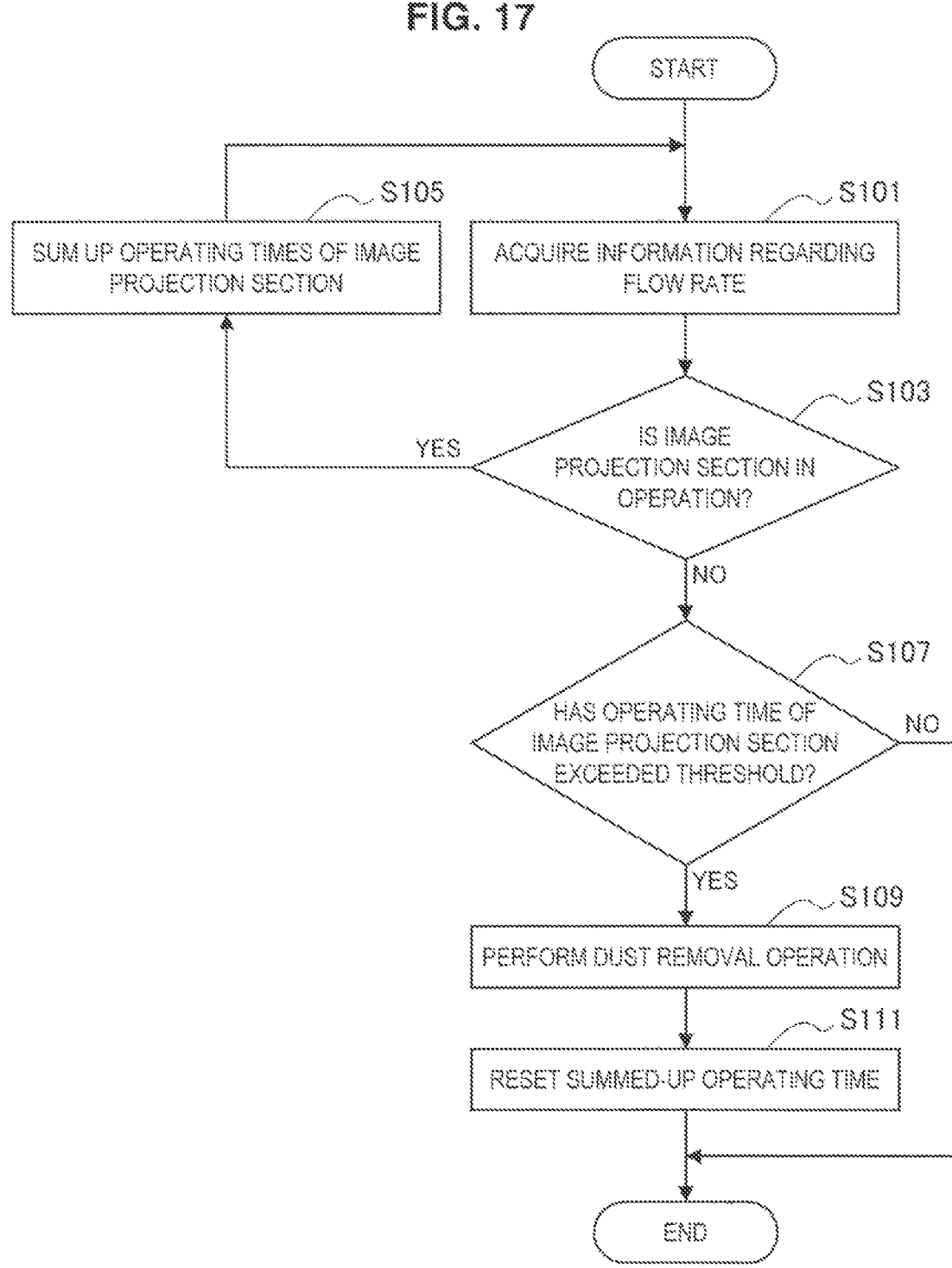

PROJECTION-TYPE IMAGE DISPLAY APPARATUS, FILTER APPARATUS, CONTROL APPARATUS, AND CONTROL METHOD

CROSS REFERENCE TO RELATED APPLICATIONS

This application is a U.S. National Phase of International Patent Application No. PCT/JP2017/028195 filed on Aug. 3, 2017, which claims priority benefit of Japanese Patent Application No. JP 2016-180514 filed in the Japan Patent Office on Sep. 15, 2016. Each of the above-referenced applications is hereby incorporated herein by reference in its entirety.

TECHNICAL FIELD

The present disclosure relates to a projection-type image display apparatus, a filter apparatus, a control apparatus, and a control method.

BACKGROUND ART

A projection-type image display apparatus (what is called a projector) in which light emitted from a light source is modulated by a display element and the light after modulation is enlarged and projected on a projection surface by a projection optical system is known as an example of display apparatuses.

In such a projection-type image display apparatus, a mechanism that takes in air from the outside is provided in order to cool optical members included in the optical system, the light source, and the display element. Further, in the air intake mechanism, a filter that collects dust is provided at an air intake port or an air passage in order to prevent dust from entering the interior of the projection-type image display apparatus due to air intake.

Here, in a case where the filter that collects dust is used for a long period of time, the filter undergoes clogging due to collected dust, and the resistance to the flow of intake air (what is called the pressure loss) is increased. In such a case, in the projection-type image display apparatus, the flow rate of air taken in from the outside is reduced, and hence cooling efficiency for each configuration of the interior is reduced.

Thus, for example, Patent Literature 1 below discloses a projection-type video display apparatus in which the clogging of a filter is suppressed by applying vibration to the filter by means of a vibration application section and shaking off dust collected on the filter.

CITATION LIST

Patent Literature

Patent Literature 1: JP 2010-19575A

DISCLOSURE OF INVENTION

Technical Problem

However, in the projection-type video display apparatus disclosed in Patent Literature 1, the impact applied to the filter by the vibration application section is relatively small, and therefore it has been difficult to shake off dust from the filter efficiently. Consequently, in the projection-type video display apparatus disclosed in Patent Literature 1, it has been difficult to reduce the frequency of maintenance of the filter.

Thus, the present disclosure proposes a new and improved projection-type image display apparatus, a new and improved filter apparatus, a new and improved control apparatus, and a new and improved control method in which dust collected on a filter can be removed more efficiently.

Solution to Problem

According to the present disclosure, there is provided a projection-type image display apparatus including: an image projection section configured to generate and project an image; a cabinet section that houses the image projection section in an interior and is provided with at least one or more air inlets; a passage section through which outside air taken in from the air inlet flows; a filter section provided in the passage section; an impact application section configured to strike the filter section; and a control section configured to control the impact application section so as to strike the filter section at a timing when the filter section vibrating by striking of the impact application section is moving toward the impact application section.

In addition, according to the present disclosure, there is provided a filter apparatus including: a filter section; an impact application section configured to strike the filter section; and a control section configured to control the impact application section so as to strike the filter section at a timing when the filter section vibrating by striking of the impact application section is moving toward the impact application section.

In addition, according to the present disclosure, there is provided a control apparatus including: a control section configured to control an impact application section configured to strike a filter section provided in a projection-type image display apparatus so as to strike the filter section at a timing when the filter section is moving toward the impact application section.

In addition, according to the present disclosure, there is provided a control method including: controlling an impact application section so as to strike a filter section provided in a projection-type image display apparatus; and controlling the impact application section by an arithmetic processing apparatus so as to strike the filter section at a timing when the filter section vibrating by striking of the impact application section is moving toward the impact application section.

According to the present disclosure, the filter section can be struck at a timing when the relative speed between the impact application section and the filter section is high, and therefore the magnitude of the impact applied from the impact application section to the filter section can be increased.

Advantageous Effects of Invention

As described above, according to the present disclosure, dust collected on a filter can be removed more efficiently in a projection-type image display apparatus.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 17 is a flow chart showing an example of a flow of a dust removal operation on the filter section by the impact application section.

MODE(S) FOR CARRYING OUT THE INVENTION

Figure 1:
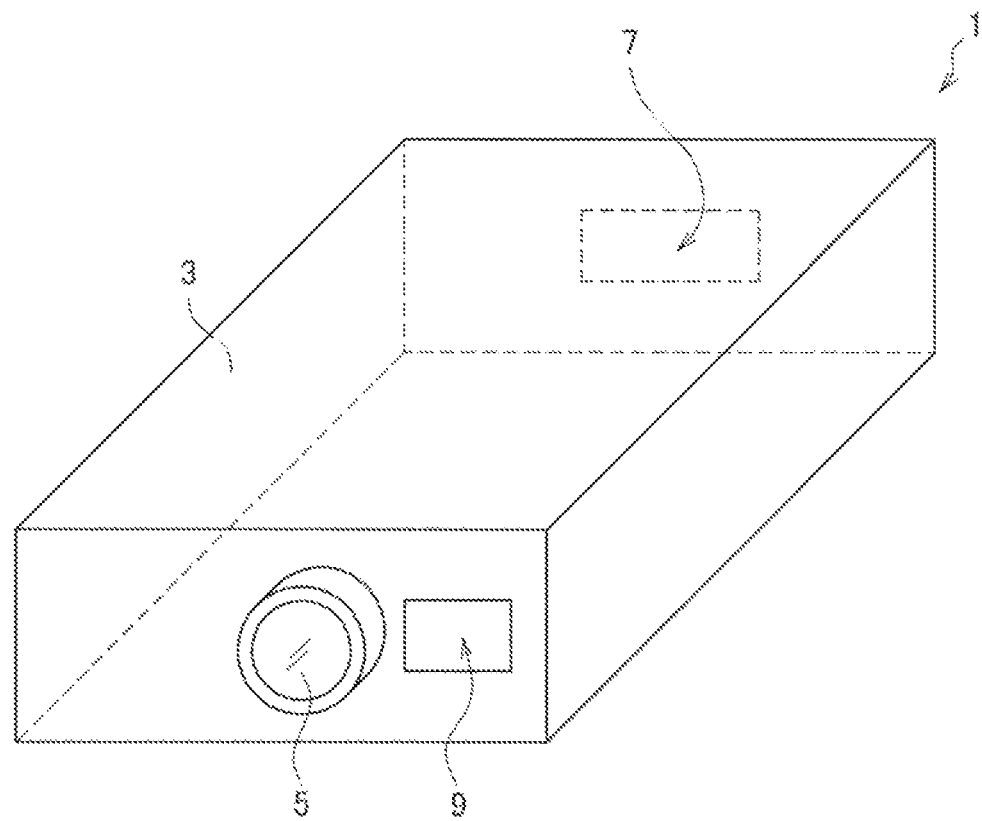
FIG. 1 is a perspective view showing an external appearance example of a projection-type image display apparatus according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description is given in the following order.
1. Projection-type image display apparatus
2. Image projection section
3. Air intake mechanism
4. Impact application section
4.1. Configuration examples
4.2. Operation examples
5. Conclusions

1. Projection-Type Image Display Apparatus

First, an external appearance example of a projection-type image display apparatus according to an embodiment of the present disclosure is described with reference to FIG. 1. FIG. 1 is a perspective view showing an external appearance example of a projection-type image display apparatus 1 according to the present embodiment.

As shown in FIG. 1, the projection-type image display apparatus 1 according to the present embodiment includes an image projection section 5 that modulates light emitted from a light source on the basis of an image and projects the light after modulation on a screen or the like and a cabinet section 3 that houses the image projection section 5 in the interior. The projection-type image display apparatus 1 may be a projector used for presentation, digital cinema, or the like, for example.

The image projection section 5 specifically includes a light source that emits light, a display element that modulates light from the light source, a projection section that projects modulated light on a screen or the like, and an optical system that performs the division and synthesis of light between the light source, the display element, and the projection section. Further, one end of the projection section of the image projection section 5 is placed to protrude from a side surface of the cabinet section 3 to the outside. A specific configuration of the image projection section 5 is described later.

The cabinet section 3 is, for example, a housing body substantially in a rectangular parallelepiped shape, and houses the image projection section 5 in the interior. Further, openings 7 and 9 are provided individually in at least two or more surfaces of the cabinet section 3. In the projection-type image display apparatus 1, the outside air is taken into the interior from one of the openings 7 and 9, the taken-in air is guided to each configuration of the image projection section 5, and then the taken-in air is released from the other of the openings 7 and 9. Thereby, the projection-type image display apparatus 1 cools each configuration of the light source, the display element, the projection section, and the optical system of the image projection section 5, and can prevent the deterioration and the function reduction of each configuration of the image projection section 5.

For example, the opening 9 provided in a surface from which the image projection section 5 protrudes (for example, referred to as a front surface) may be used as an air outlet, and the opening 7 provided in the back surface facing the front surface may be used as an air inlet. Further, the opening is not limited to the example shown in FIG. 1, and may be provided in any surface of the cabinet section 3. For example, an opening may be provided in a side surface different from the front surface or the back surface of the cabinet section 3. Furthermore, a plurality of air inlets and a plurality of air outlets may be provided in the cabinet section 3.

Note that the projection-type image display apparatus 1 further includes a control section (not illustrated) that controls the operation of each configuration of the interior of the image projection section 5 etc. The control section includes, for example, a central processing unit (CPU), a random access memory (RAM), a read-only memory (ROM), etc.; and temporarily saves in the RAM a program stored in the ROM in advance and executes the program with the CPU, and thereby controls various operations of the projection-type image display apparatus 1. Further, the control section may include an arbitrary hardware device and an arbitrary software application.

2. Image Projection Section

Figure 2:
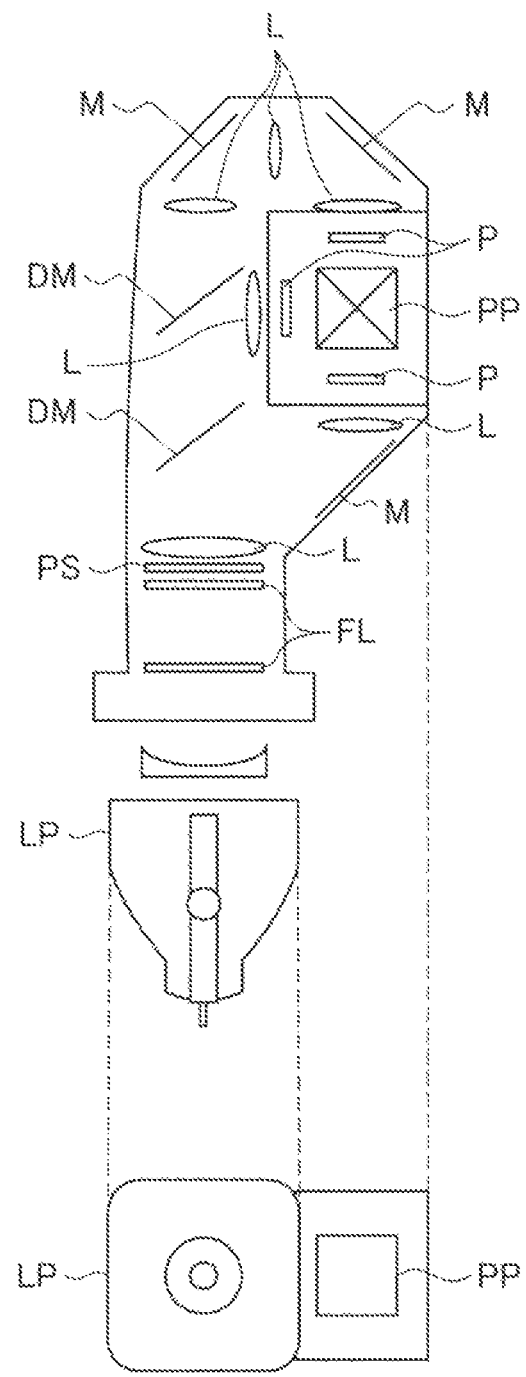
FIG. 2 is a schematic diagram showing an example of a configuration of an image projection section according to the embodiment.
Figure 3:
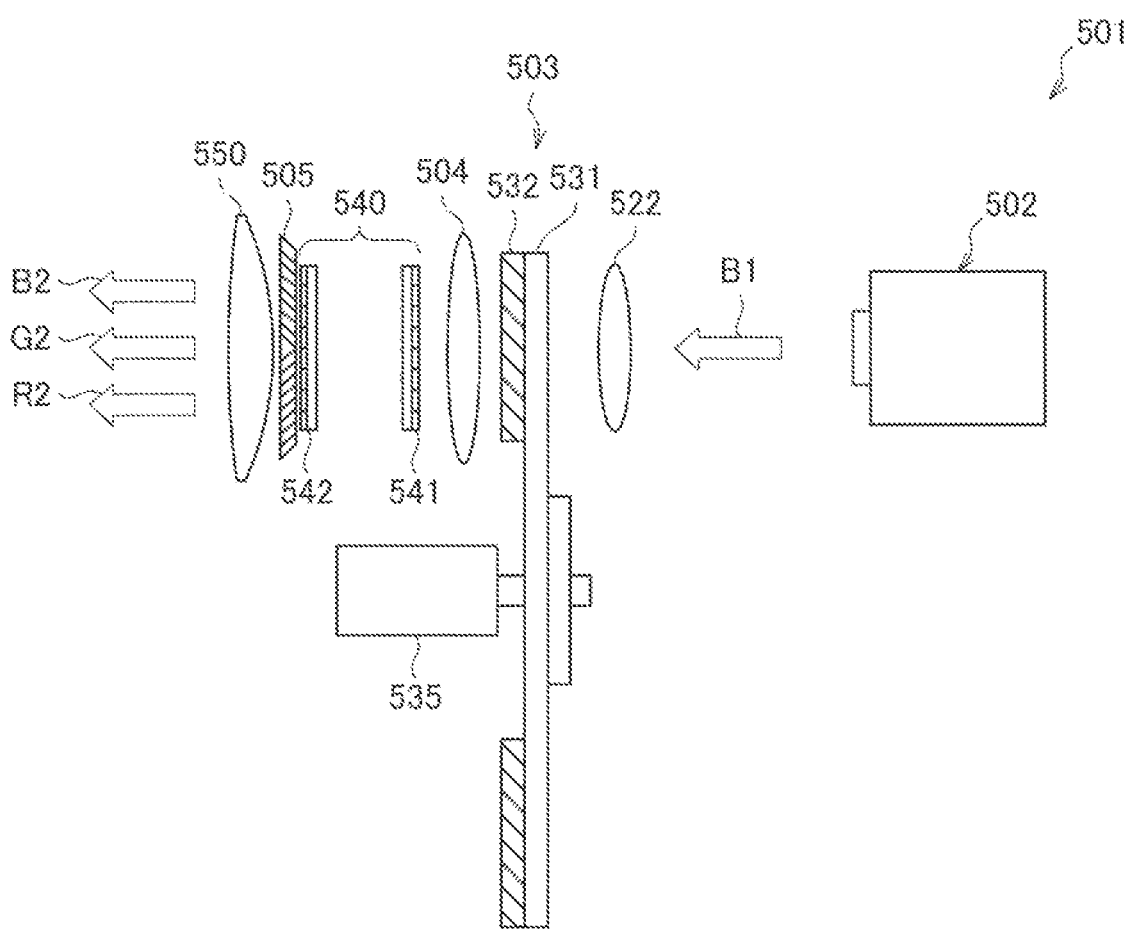
FIG. 3 is a schematic diagram showing an example of a configuration of a light source in a case where a laser light source that radiates light in a specific wavelength range is used in the embodiment.

Next, an example of a specific configuration of the image projection section 5 included in the projection-type image display apparatus 1 according to the present embodiment is described with reference to FIG. 2 and FIG. 3. FIG. 2 is a schematic diagram showing an example of the configuration of the image projection section 5. Further, FIG. 3 is a schematic diagram showing an example of the configuration of the light source in a case where a laser light source that radiates light in a specific wavelength range is used.

Note that what is shown below is only an example, and each configuration of the image projection section 5 included in the projection-type image display apparatus 1 according to the present embodiment is not limited to the configuration mentioned below. Each configuration of the image projection section 5 may use common configurations known as projection-type image display apparatuses.

As shown in FIG. 2, the image projection section 5 includes, for example, a light source LP that radiates white light, a plurality of fly-eye lenses FL, a polarization conversion element PS, a plurality of dichroic mirrors DM, condensing lenses L and total reflection mirrors M provided individually on optical paths, liquid crystal panels P corresponding to some colors, and a dichroic prism PP.

In such an image projection section 5, first, light radiated from the light source LP passes through the fly-eye lenses FL, the polarization conversion element PS, and the condensing lens L. Next, the light radiated from the light source LP is separated into rays of light corresponding to the colors of RGB by the dichroic mirrors DM each of which reflects only light in a specific wavelength range. Subsequently, the separated rays of light of the colors of RGB are caused to be incident on the liquid crystal panels P provided to correspond to the respective colors, via the total reflection mirrors M and the condensing lenses L, and are subjected to modulation in accordance with an image signal by the respective liquid crystal panels P. After that, the rays of modulated light of the colors are synthesized by the dichroic prism PP; then, the synthesized light is radiated to a projection section (not illustrated), and is enlarged and projected on a screen or the like. By such a configuration, the image projection section 5 can enlarge and project an image inputted from the outside on a screen or the like.

Here, heat radiating bodies among the configurations mentioned above are, for example, the light source LP, the polarization conversion element PS, the liquid crystal panels P, etc. It is important that these configurations be moderately cooled by feeding the outside air, because the deterioration of material quality or the reduction of function occurs due to heat. In the projection-type image display apparatus 1 according to the present embodiment, the outside air is taken in from the opening 7 provided in the cabinet section 3 by an air intake mechanism, and is fed to the configurations of the image projection section 5; thereby, these configurations can be cooled.

Note that, although FIG. 2 shows an example in which a transmission-type liquid crystal panel is used as the liquid crystal panel P, also a reflection-type liquid crystal panel may be used as the liquid crystal panel P. Further, in place of the liquid crystal panel P, a digital micromirror device or the like may be used as an image modulation element. Further, in place of the dichroic prism PP, also a polarization beam splitter, a color synthesis prism, a total internal refection (TIR) prism, etc. may be used.

Here, in the image projection section 5, for example, a mercury lamp, a xenon lamp, a halogen lamp, a white light emitting diode (LED), or the like that radiates white light may be used as a light source. Further, also a laser light source such as a semiconductor laser that radiates light in a specific wavelength range may be used as a light source by using the configuration shown in FIG. 3.

As shown in FIG. 3, in a case where a semiconductor laser or the like that radiates light of a specific wavelength is used as a light source, a light source 501 includes, for example, a laser light source 502, a condensing lens 522, a phosphor wheel 503, a collimating optical system 504, an integrator element 540, a polarization conversion element 505, and a superimposed lens 550.

Specifically, the laser light source 502 is a blue laser light source, and may oscillate laser light B1 having a peak wavelength in the wavelength range of 400 nm to 500 nm. Laser light B1 radiated from the laser light source 502 is transmitted through the condensing lens 522, and is then incident on the phosphor wheel 503.

Here, the phosphor wheel 503 includes a substrate 531 in a disc-like shape that transmits laser light B1, a phosphor layer 532 provided on the substrate 531, and a motor 535 that rotates the substrate 531, with the normal line passing through the center of the substrate 531 as the rotation axis. The phosphor layer 532 contains a fluorescent substance that generates visible light of a wavelength longer than the wavelength of laser light B1 by being excited by laser light B1, and part of the laser light B1 is converted to light (that is, yellow light) in a wavelength range including the red color wavelength range to the green color wavelength range. Further, the phosphor layer 532 transmits the remaining laser light B1 excluding the part used for the excitation of the fluorescent substance. Thus, the light radiated from the phosphor layer 532 is white light resulting from the color mixing of blue light of part of laser light B1 and yellow light that is fluorescence from the phosphor layer 532.

Note that, since the substrate 531 is rotated by the motor 535, the planar position of the phosphor layer 532 where laser light B1 is applied changes constantly. Thereby, the phosphor layer 532 can prevent a situation where the fluorescent substance is degraded by an identical position being irradiated with excitation light for a long time.

Next, the light that has passed through the phosphor wheel 503 is incident on the collimating optical system 504 to be converted to parallel light, and is then incident on the integrator element 540.

The integrator element 540 includes a first fly-eye lens 541 and a second fly-eye lens 542. Each of the first fly-eye lens 541 and the second fly-eye lens 542 includes a plurality of microlenses in a two-dimensional arrangement that corresponds to the arrangement of the other fly-eye lens; parallel light incident on the first fly-eye lens 541 is divided into a plurality of light fluxes, and then the light fluxes are caused to be formed as images by the second fly-eye lens 542. Thus, each of the microlenses of the second fly-eye lens 542 can be made to function as a secondary light source; therefore, the luminance distribution of light radiated to the polarization conversion element 505 can be arranged uniformly.

The polarization states of the rays of light incident on the polarization conversion element 505 from the integrator element 540 are equalized by the polarization conversion element 505, and then the resulting light is radiated from the light source 501 via the superimposed lens 550, as white light including blue light B2, green light G2, and red light R2. By such a configuration, the light source 501 can radiate white light even in a case where a semiconductor laser or the like that radiates light in a specific wavelength range is used as a light source.

3. Air Intake Mechanism

Figure 4:
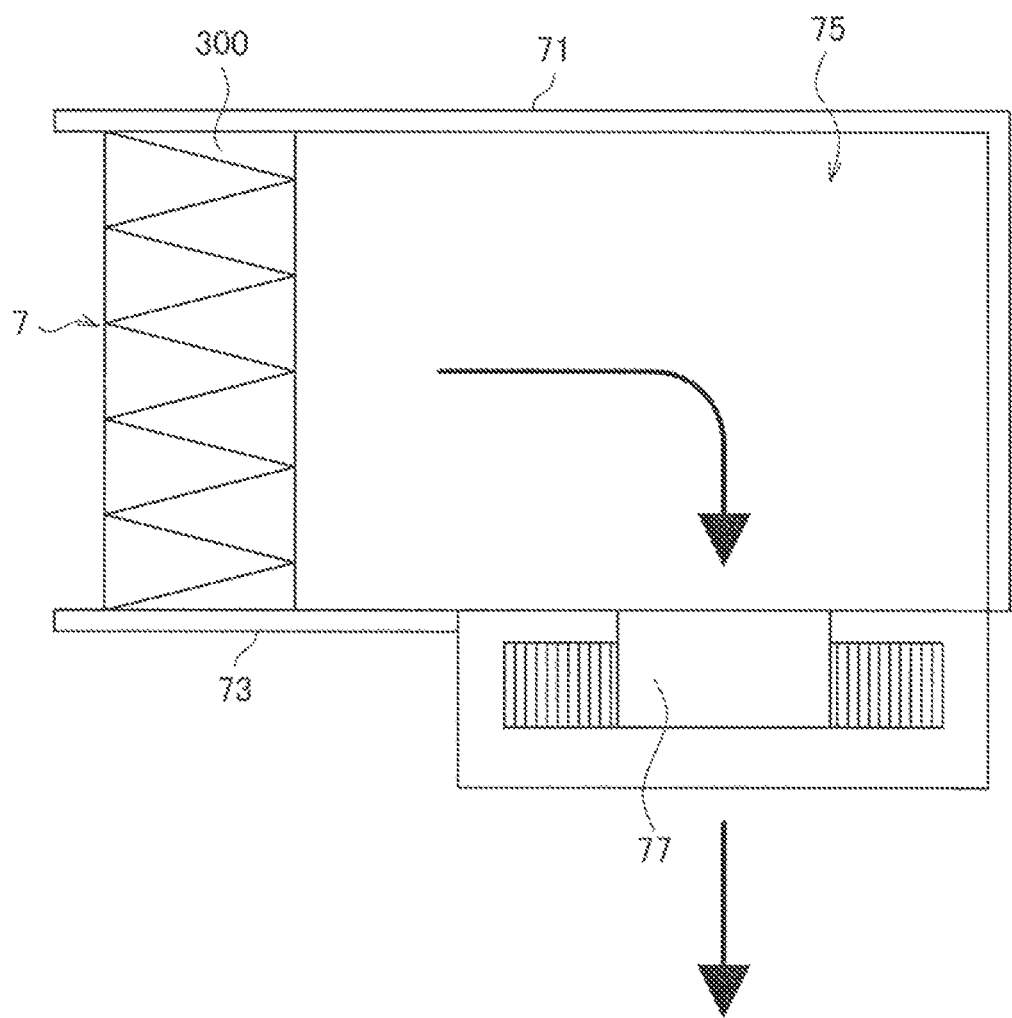
FIG. 4 is a schematic diagram showing an example of a configuration of an air intake mechanism according to the embodiment.
Figure 5:
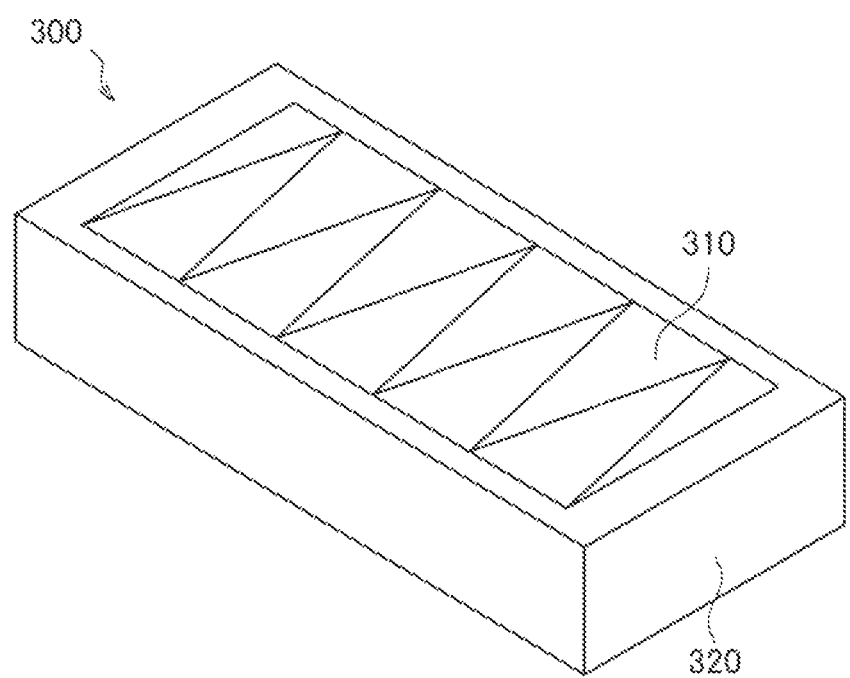
FIG. 5 is a perspective view schematically showing a configuration of a filter section according to the embodiment.

Next, an air intake mechanism included in the projection-type image display apparatus 1 according to the present embodiment is described with reference to FIG. 4 and FIG. 5. FIG. 4 is a schematic diagram showing an example of the configuration of an air intake mechanism.

As shown in FIG. 4, an air intake mechanism included in the projection-type image display apparatus 1 according to the present embodiment includes an opening 7 (hereinafter, occasionally referred to as an air inlet 7) through which the outside air is taken in, a filter section 300 that collects dust, a passage section 75 through which the taken-in air flows, separating walls 71 and 73 forming the passage section 75, and a fan section 77 that sucks in the outside air.

The air inlet 7 is an opening that is provided in the cabinet section 3 in order to take in the outside air. The shape and size of the air inlet 7 are not particularly limited, and may be an arbitrary shape and an arbitrary size. Further, the air inlet 7 may be provided not only in the back surface of the cabinet section 3 of the projection-type image display apparatus 1 but also in any of side surfaces, the upper surface, the lower surface, and the front surface.

The separating walls 71 and 73 are structure members forming the passage section 75 that guides air taken in from the air inlet 7. The material quality of the separating walls 71 and 73 is not particularly limited, and may be any material quality. The passage section 75 formed using the separating walls 71 and 73 guides air taken in from the air inlet 7 to the filter section 300, and further guides air that has passed through the filter section 300 to each configuration of the image projection section 5. Note that the shape of the passage section 75 is not particularly limited, and may be an arbitrary shape. Further, although the illustration is omitted in FIG. 4, the passage section 75 is provided also in a later stage of the fan section 77; and guides taken-in air to each configuration of the image projection section 5, and then guides the air to an opening 9 (that is, an air outlet 9) provided in the cabinet section 3.

The fan section 77 sucks in the outside air via the air inlet 7. The fan section 77 may be, for example, a sirocco fan, but may be a fan of any mechanism or shape as long as it is capable of sucking in air. For example, the fan section 77 may be a propeller fan. Note that, in a case where a sirocco fan is used for the fan section 77, the direction of the sucked-in air current can be bent. Further, a sirocco fan has higher quietness than a propeller fan.

The filter section 300 collects dust in air taken in the interior of the projection-type image display apparatus 1. Specifically, the filter section 300 is provided in the passage section 75 through which air taken in from the air inlet 7 flows, via an elastic member (not illustrated), and causes the taken-in air to pass through to collect dust in the air.

Here, a specific configuration of the filter section 300 is described with reference to FIG. 5. FIG. 5 is a perspective view schematically showing the configuration of the filter section 300. As shown in FIG. 5, the filter section 300 includes a filter 310 that collects dust and a frame 320 holding the filter 310.

The filter 310 is, for example, a sponge, a nonwoven fabric, or the like provided with a large number of holes that are so minute that air can pass through but dust cannot pass through. However, the filter 310 may be any material as long as it is capable of collecting dust contained in air, and may be, for example, a filter or the like that collects dust by electrification based on static electricity or the like.

The frame 320 is a structure member holding the filter 310. Further, the frame 320 is provided in a shape by which the filter 310 can be held so that air can pass through the filter 310. For example, the frame 320 is substantially in a rectangular parallelepiped shape, and may have a shape surrounding the side surface of the filter 310 such that at least two or more surfaces are opened. Note that, although the material quality of the frame 320 may be any material quality, it may be, for example, various resins such as an acrylonitrile butadiene styrene (ABS) resin and a polyacetal (POM) resin, various metals such as aluminum alloy and stainless steel, etc.

Further, an elastic member (not illustrated) is provided between the filter section 300 and each of the separating walls 71 and 73, and the filter section 300 may be provided in the passage section 75 via the elastic members. Further, the filter section 300 includes an elastic member (not illustrated) between the frame 320 and the filter 310, and the frame 320 may hold the filter 310 via the elastic member. The elastic member may be any member as long as it is a member capable of making some elastic deformation, and may be, for example, a cushion, a sponge, rubber, a spring, or the like. In such a case, when the filter section 300 is struck by an impact application section described later, a larger impact can be applied to the filter 310, and therefore dust accumulated on the filter 310 can be shaken off more efficiently.

Here, the filter section 300 collects dust in air taken in the interior of the projection-type image display apparatus 1, and therefore dust continues to be gradually accumulated in accordance with the total amount of taken-in air. In such a case, the filter 310 undergoes clogging due to accumulated dust, and accordingly the resistance to air flowing through the passage section 75 (what is called the pressure loss) increases gradually. Consequently, in a case where the flow rate of air taken in from the outside is reduced, cooling efficiency for each configuration of the image projection section 5 is reduced, and hence the degradation of material quality or the reduction of function of each configuration of the image projection section 5 occurs due to temperature increase.

The projection-type image display apparatus 1 according to the present embodiment has a configuration in which dust accumulated in the filter section 300 is removed by striking the filter section 300 by means of an impact application section. Further, the projection-type image display apparatus 1 can remove dust accumulated in the filter section 300 more efficiently by controlling the timing of striking of the filter section 300 by the impact application section. Thereby, the projection-type image display apparatus 1 can remove dust from the filter section 300 more efficiently, and can therefore reduce the frequency of maintenance.

In the following, specific configuration examples and specific operation examples of an impact application section included in the projection-type image display apparatus 1 are described in detail.

4. Impact Application Section 4.1. Configuration Examples

Figure 6:
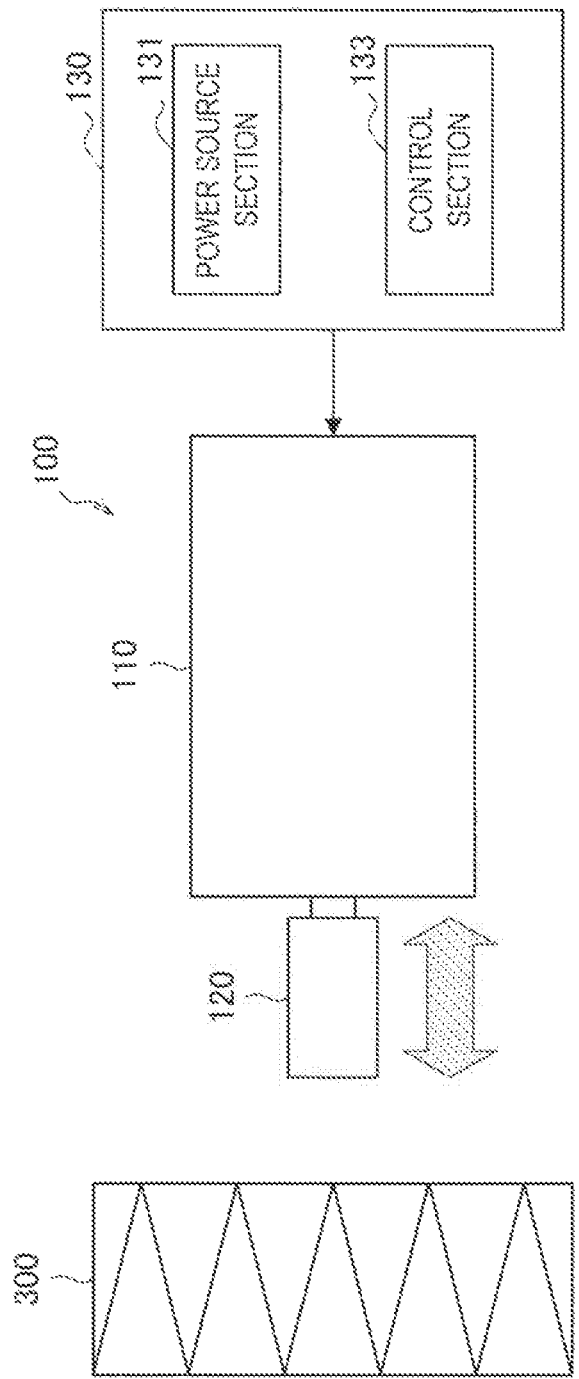
FIG. 6 is a schematic diagram showing an example of a configuration of an impact application section according to the embodiment.

First, a configuration example of an impact application section included in the projection-type image display apparatus 1 according to the present embodiment is described with reference to FIG. 6. FIG. 6 is a schematic diagram showing an example of the configuration of an impact application section.

As shown in FIG. 6, an impact application section 100 included in the projection-type image display apparatus 1 according to the present embodiment includes a striking section 120 that strikes the filter section 300, a driving section 110 that reciprocates the striking section 120 toward the filter section 300, and a control board 130 that controls the driving section 110.

The striking section 120 is a member that applies impact to the filter 310 of the filter section 300 by striking the frame 320. The striking section 120 can remove dust accumulated on the filter 310 from the filter 310 by shaking off the dust by impact. Note that the filter 310 contains a relatively soft material in many cases, and therefore the striking section 120 can apply a larger impact to the filter 310 by striking the frame 320 holding the filter 310.

The striking section 120 may have any material quality as long as it has a strength to withstand striking on the frame 320 of the filter section 300, and may contain various resins such as an ABS resin and a POM resin, various metals such as aluminum alloy and stainless steel, etc. However, the energy of impact that the striking section 120 applies to the filter section 300 is in proportion to the mass of the striking section 120; hence, to apply a larger impact to the filter section 300, the striking section 120 contains a metal with a relatively large specific gravity.

The driving section 110 reciprocates the striking section 120 toward the filter section 300, and thereby causes the striking section 120 to strike the filter section 300. The driving section 110 may use any known actuator as long as it is an actuator that reciprocates by the supply of electric power. For example, the driving section 110 may be a linear motor or an actuator using a solenoid. In a case where the driving section 110 is an actuator using a solenoid, the impact application section 100 can have a simpler configuration.

For example, in a case where the driving section 110 is an actuator using a solenoid, the striking section 120 can be moved by supplying electric power to the solenoid to generate magnetic force in a coil of the solenoid. Specifically, a plunger provided with the striking section 120 in an end portion is drawn into the coil of the solenoid by magnetic force generated by the coil, and thereby the striking section 120 is pushed out toward the filter section 300. Further, a spring (not illustrated) for returning the plunger to the original position is provided in the driving section 110, and the plunger pushed out to the filter section 300 side is returned to the original position by the tension of the spring.

Note that the actuator included in the driving section 110 may be a motor or the like that rotationally moves by the supply of electric power. In such a case, the driving section 110 converts rotational motion to reciprocal motion by using a mechanical mechanism such as a crank, and can push out the striking section 120 toward the filter section 300.

The control board 130 includes a power source section 131 and a control section 133, and controls the timing of striking by the striking section 120. Specifically, the power source section 131 supplies electric power to the driving section 110, and the control section 133 controls the timing of electric power supply to the driving section 110. Note that the power source section 131 may use a power source for operating the image projection section 5, or may use a power source different from a power source for operating the image projection section 5. Further, the control section 133 may be a microprocessor or an arithmetic processing circuit such as a micro-processing unit (MPU). Note that a method for controlling the timing of striking of the impact application section 100 by the control section 133 is described later.

4.2. Operation Examples

Next, the operation of striking of the filter section 300 by the impact application section 100 described above is described with reference to FIG. 7 to FIG. 11.

In the projection-type image display apparatus 1 according to the present embodiment, the impact application section 100 can remove dust from the filter section 300 more efficiently by striking the filter section 300 at a timing when the impact applied to the filter section 300 is larger. Specifically, the impact application section 100 strikes the filter section 300, and then further strikes the filter section 300 at a timing when the filter section 300 vibrating by the impact of striking is moving toward the impact application section 100. Thereby, the impact application section 100 can strike the filter section 300 at a higher relative speed, and can therefore make the impact on the filter section 300 larger.

Hereinbelow, the operation of striking of the filter section 300 by the impact application section 100 is described with reference to FIG. 7 to FIG. 11. FIG. 7 to FIG. 11 are schematic diagrams describing the operation of striking of the filter section 300 by the impact application section 100. Note that the illustration of the control board 130 is omitted.

Figure 7:
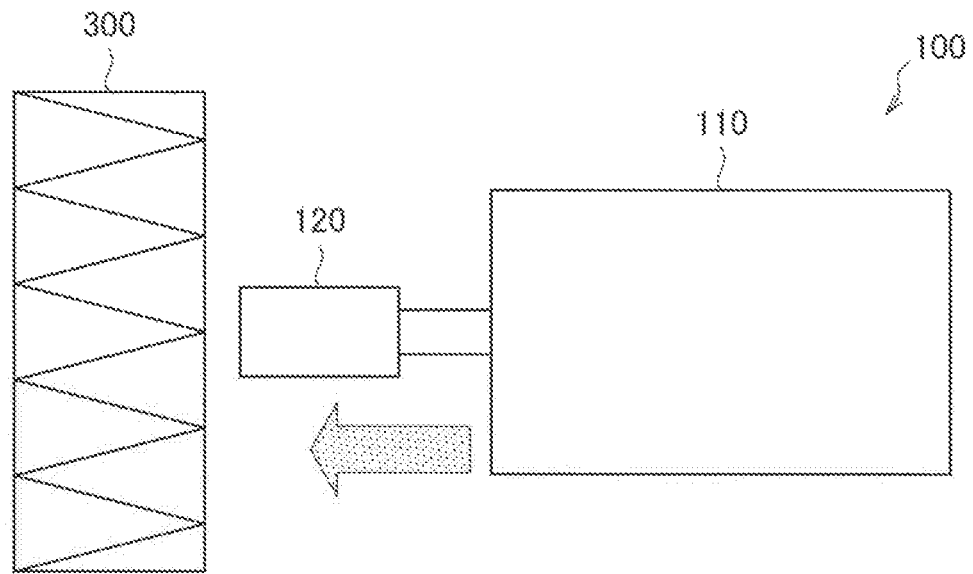
FIG. 7 is a schematic diagram describing an operation of striking of the filter section by the impact application section.
Figure 8:
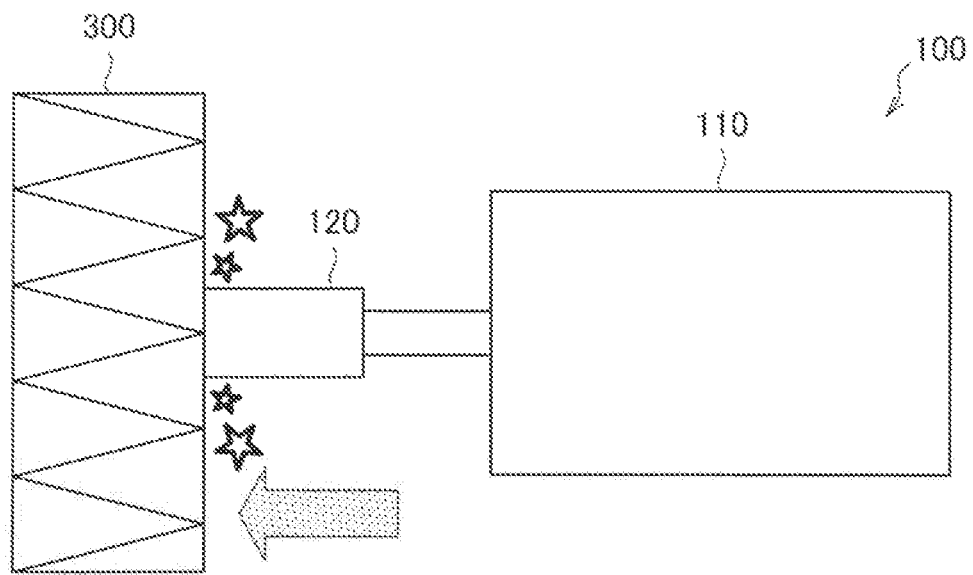
FIG. 8 is a schematic diagram describing the operation of striking of the filter section by the impact application section.

First, as shown in FIG. 7 and FIG. 8, in a case where the operation of removal of dust from the filter section 300 is started, the impact application section 100 strikes the filter section 300 by means of the striking section 120 by using the driving section 110 to push out the plunger toward the filter section 300.

Figure 9:
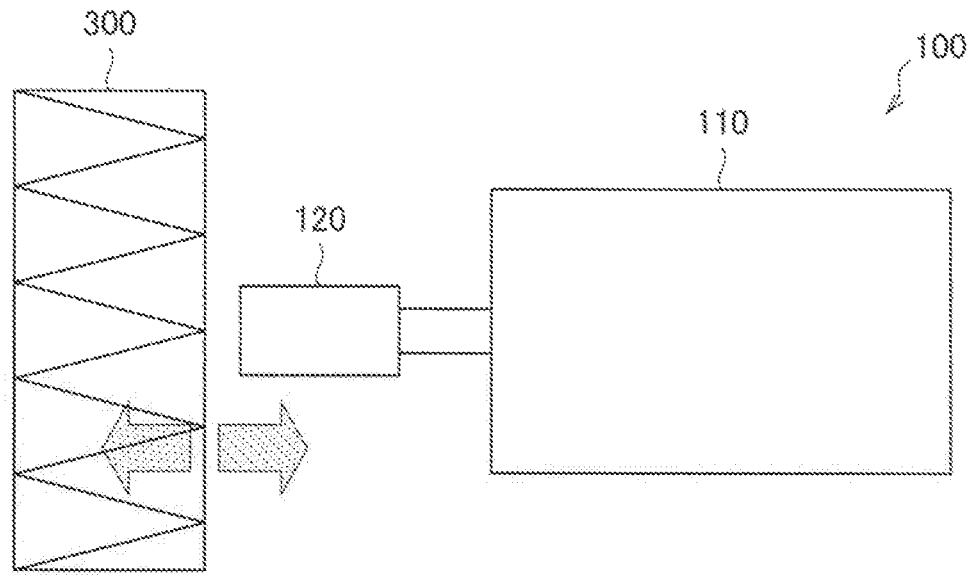
FIG. 9 is a schematic diagram describing the operation of striking of the filter section by the impact application section.

After the striking, as shown in FIG. 9, the filter section 300 is warped and repelled on the opposite side to the impact application section 100 by elastic deformation of elastic members (not illustrated) supporting the filter section 300. Further, the impact application section 100 attempts to return the plunger and the striking section 120 to the original positions before the striking. That is, in FIG. 9, the filter section 300 and the striking section 120 move so as to go away in opposite directions to each other.

Figure 10:
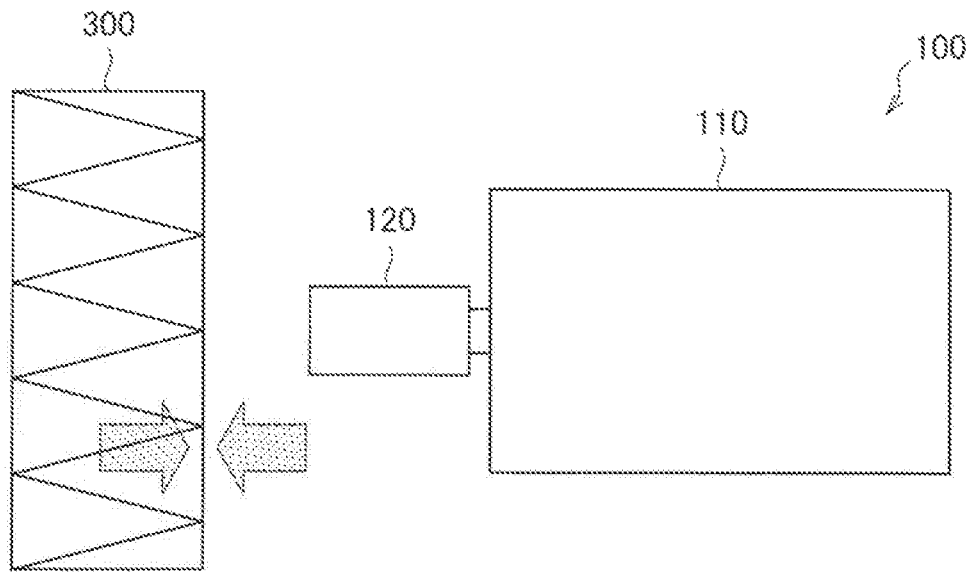
FIG. 10 is a schematic diagram describing the operation of striking of the filter section by the impact application section.

After that, as shown in FIG. 10, the filter section 300 begins to be displaced toward the impact application section 100 in order to cancel the warp of the elastic members (not illustrated) that have been warped by the impact of striking. In this event, the impact application section 100 uses the driving section 110 to begin to push out the plunger and the striking section 120 toward the filter section 300. That is, in FIG. 10, the filter section 300 and the striking section 120 move in directions in which they come close to each other.

Figure 11:
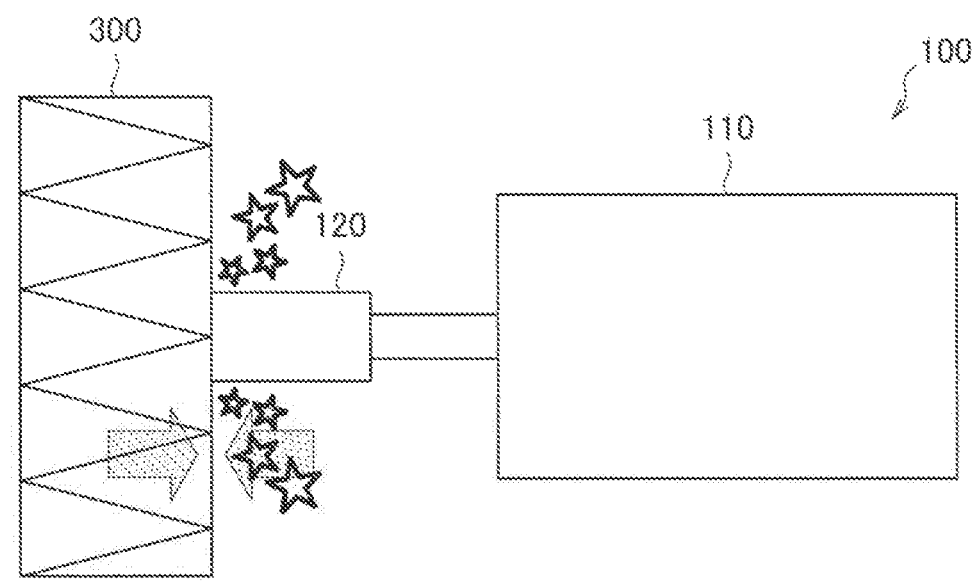
FIG. 11 is a schematic diagram describing the operation of striking of the filter section by the impact application section.

Further, as shown in FIG. 11, the impact application section 100 strikes the filter section 300 by means of the striking section 120 at a timing when the filter section 300 is being displaced toward the impact application section 100. That is, in FIG. 11, the impact application section 100 strikes the filter section 300 at a timing when the filter section 300 and the striking section 120 are coming close to each other.

In such a case, the impact application section 100 can strike the filter section 300 in a state where the relative speed between the filter section 300 and the striking section 120 is higher than in a case where the filter section 300 is at rest. Therefore, the impact application section 100 can apply a larger impact to the filter section 300. Note that, to maximize the relative speed between the filter section 300 and the striking section 120, striking may be performed at a timing when the filter section 300 passes through the position at a time of rest (that is, a state where warp is zero).

For example, the impact application section 100 may strike the filter section 300 at a timing when the filter section 300 is moving at a speed higher than a prescribed speed. In such a case, the impact application section 100 can strike the filter section 300 at a timing when the relative speed between the filter section 300 and the striking section 120 is higher.

Note that the prescribed speed may be, for example, a speed of 50% of the maximum moving speed of the filter section 300.

After the striking shown in FIG. 11, the state of the filter section 300 and the striking section 120 returns to the state shown in FIG. 9. Therefore, by repeating the states shown in FIG. 9 to FIG. 11, the impact application section 100 can strike the filter section 300 continually in a state where the relative speed between the filter section 300 and the striking section 120 is higher.

Next, control for striking the filter section 300 at a timing when the filter section 300 and the striking section 120 are coming close to each other as described above is described with reference to FIG. 12. Here, FIG. 12 is a graph showing the displacement of the filter section 300 after one time of striking.

Figure 12:
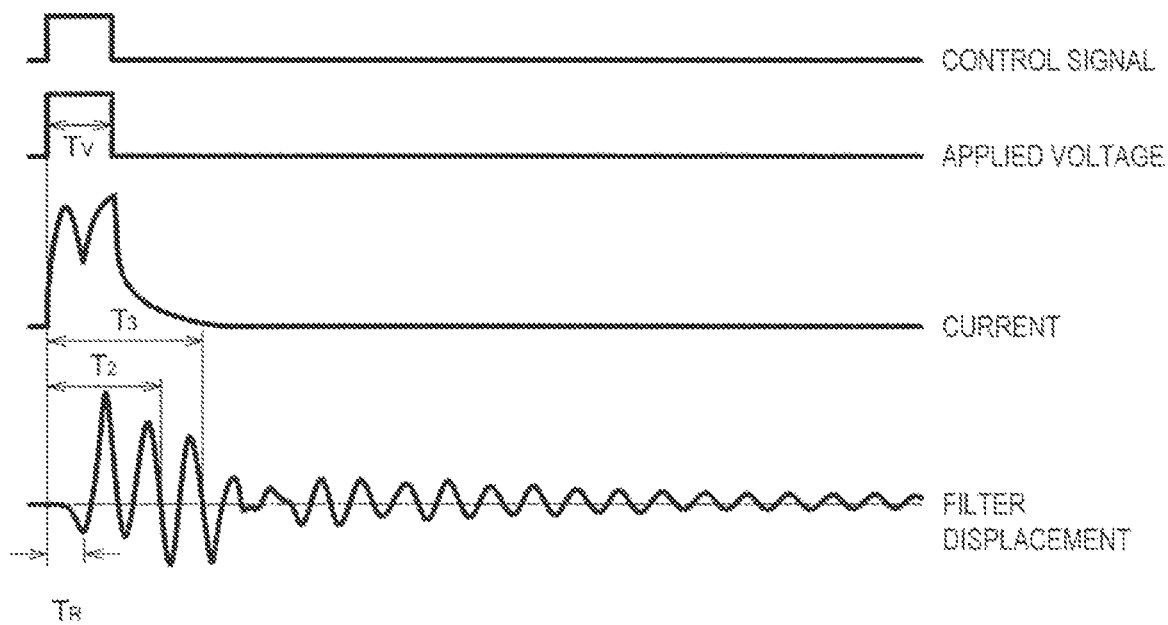
FIG. 12 is a graph showing displacement of the filter section after one time of striking.

In FIG. 12, "CONTROL SIGNAL" is a signal that is emitted from the control board 130 and that controls the operation of the driving section 110, and "APPLIED VOLTAGE" and "CURRENT" are the waveforms of voltage and current applied to the driving section 110. Further, "FILTER DISPLACEMENT" is a waveform showing the displacement of the frame 320 in the direction of a straight line connecting the impact application section 100 and the filter section 300. Note that the waveform of "FILTER DISPLACEMENT" is shown by defining a direction toward the impact application section 100 as "negative."

In FIG. 12, the striking section 120 starts to come close to the filter section 300 by a voltage and a current being applied, and after a lapse of time $T_R$, strikes the filter section 300 to cause filter displacement to occur. After the striking, as shown in FIG. 7 to FIG. 11, the displacement of the filter section 300 supported by the elastic members that have been warped by the striking is attenuated while vibrating in the direction of the straight line connecting the impact application section 100 and the filter section 300.

To strike the filter section 300 at a timing when the filter section 300 and the striking section 120 are coming close to each other, striking is performed in a state where the slope of the displacement of the filter section 300 is negative. For example, the relative speed between the filter section 300 and the striking section 120 can be maximized by performing striking at a timing when the displacement of the filter section 300 passes through 0 in the direction from the positive to the negative.

Therefore, to strike the filter section 300 at a timing when the displacement of the filter section 300 passes through 0 in the direction from the positive to the negative, the interval of the application of voltage and current may be set with consideration of the time $T_R$ from when a voltage and a current are applied to when the striking section 120 strikes the filter section 300. That is, to strike the filter section 300 upon a lapse of time $T_2$ or $T_3$ after the first round of application of voltage and current, the second round of application of voltage and current may be performed with a time interval obtained by subtracting $T_V$ and $T_R$ from $T_2$ (or $T_3$).

However, the time interval of the application of voltage and current may be set longer than a time interval with which the driving section 110 of the impact application section 100 is operable continuously. This is because, in a case where the time interval of the application of voltage and current is too short, the driving section 110 cannot operate to follow the application of voltage and current.

Here, FIG. 13 to FIG. 16 show examples of filter displacement in a case where the filter section 300 is continually struck while the time interval of the application of voltage and current is varied.

Figure 14:
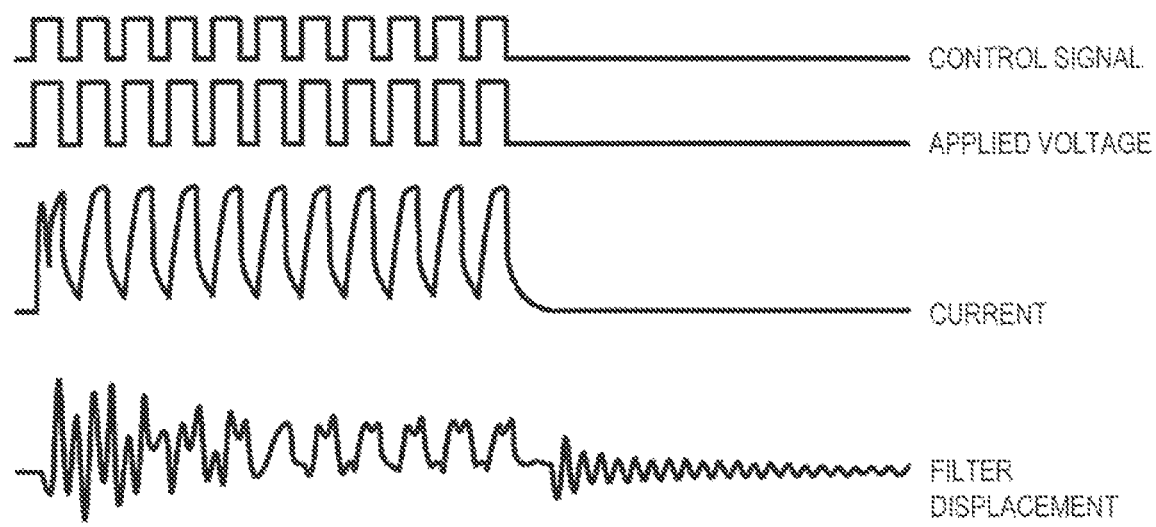
FIG. 14 is a graph showing displacement of the filter section in a case where striking is performed with a time interval shorter than a time interval of the embodiment.
Figure 15:
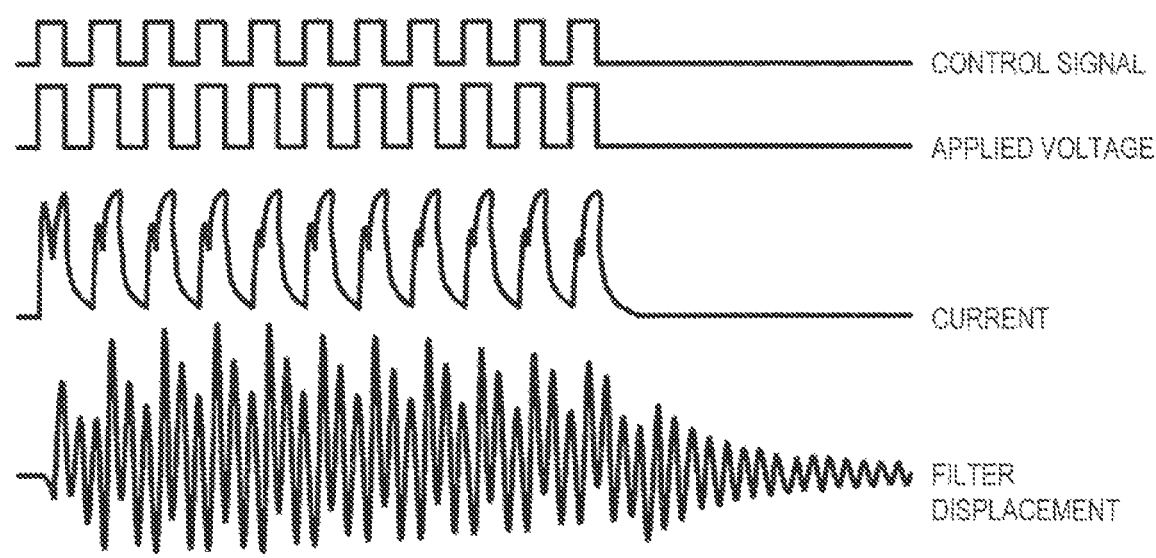
FIG. 15 is a graph showing displacement of the filter section in a case where striking is performed with a time interval according to the embodiment.

FIG. 15 is a graph showing the displacement of the filter section 300 in a case where striking is performed with a time interval according to the present embodiment. On the other hand, FIG. 13 and FIG. 14 are graphs showing the displacement of the filter section 300 in a case where striking is performed with time intervals shorter than the time interval of the present embodiment, and FIG. 16 is a graph showing the displacement of the filter section 300 in a case where striking is performed with a time interval longer than the time interval of the present embodiment.

Figure 13:
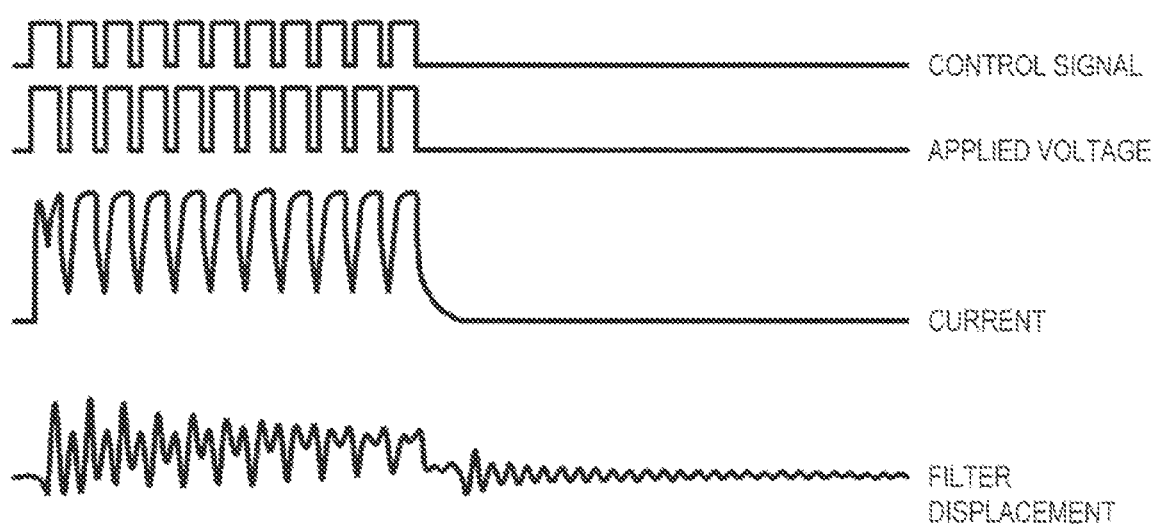
FIG. 13 is a graph showing displacement of the filter section in a case where striking is performed with a time interval shorter than a time interval of the embodiment.
Figure 16:
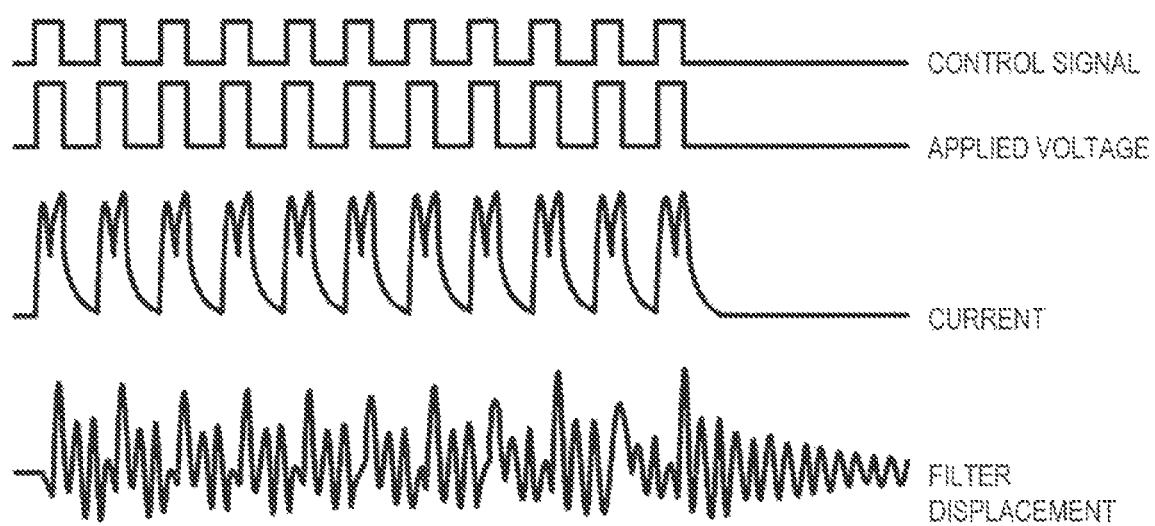
FIG. 16 is a graph showing displacement of the filter section in a case where striking is performed with a time interval longer than a time interval of the embodiment.

Note that the pulse interval of the applied voltage of FIG. 13 is, for example, 10 msec, the pulse interval of the applied voltage of FIG. 14 is, for example, 20 msec, the pulse interval of the applied voltage of FIG. 15 is, for example, 30 msec, and the pulse interval of the applied voltage of FIG. 16 is, for example, 40 msec.

Referring to the graphs shown in FIG. 13 to FIG. 16, it can be seen that the displacement of the filter section 300 is larger in a case where striking is performed with the time interval according to the present embodiment than in a case where striking is performed with a time interval shorter or longer than the time interval of the present embodiment. That is, it can be seen that, according to the present embodiment, the impact application section 100 can increase the displacement of the filter section 300 by applying a larger impact to the filter section 300. Therefore, according to the present embodiment, dust accumulated in the filter section 300 can be shaken off more efficiently by applying a larger impact to the filter section 300.

Here, the time interval of the application of voltage or the like for striking the filter section 300 at a timing when the filter section 300 and the striking section 120 are coming close to each other is influenced by the vibration period of the filter section 300, more specifically, influenced by the natural frequency of the filter section 300. Therefore, the time interval of the application of voltage or the like to achieve striking at the timing described above may vary with the mass, rigidity, shape, and size of the filter section 300.

Hence, to strike the filter section 300 at a timing when the filter section 300 is moving toward the impact application section 100 in cases where the shape or material quality of the filter section 300 is different, the impact application section 100 sets the time interval of the application of voltage or the like for each case.

Further, the natural frequency of the filter section 300 may vary due to a reduction in rigidity caused by the deterioration over time of the frame 320 etc. of the filter section 300, an increase in mass caused by the accumulation of dust on the filter 310, etc. Hence, the impact application section 100 may strike the filter section 300 while sweeping the time interval of the application of voltage and current, with the set time interval as the center.

Further, the impact application section 100 may vary the time interval of the application of voltage and current for striking (that is, the period of striking) on the basis of the state of the projection-type image display apparatus 1 or the filter section 300. Specifically, the impact application section 100 estimates the amount of dust accumulated in the filter section 300, and may vary the time interval of the application of voltage or the like for striking in accordance with the amount of dust accumulated.

For example, the impact application section 100 may estimate the amount of dust accumulated on the filter 310 by assessing the degree of clogging of the filter 310 from the rotation rate of the fan section 77, the air flow rate detected by an air flow sensor provided in the fan section 77, etc. Further, the impact application section 100 may estimate the amount of dust accumulated on the filter 310 from the summed-up operating time of the image projection section 5. Further, the impact application section 100 may estimate the amount of dust accumulated on the filter 310 on the basis of the mass of the filter 310 detected by an acceleration sensor, a mass sensor, or the like provided in the filter section 300. Note that the mass of the filter section 300 is expected to increase in association with the accumulation of dust on the filter 310. Therefore, it is presumed that, in association with the accumulation of dust on the filter 310, the natural frequency of the filter section 300 tends to be lower and the time interval of the application of voltage and current for striking tends to be longer.

Further, a flow of operation in an event in which, in the projection-type image display apparatus 1 according to the present embodiment, the impact application section 100 performs a striking operation (that is, a dust removal operation) on the filter section 300 is described with reference to FIG. 17. FIG. 17 is a flow chart showing an example of a flow of the dust removal operation on the filter section 300 by the impact application section 100.

As shown in FIG. 17, first, the impact application section 100 acquires information regarding the rotation rate of the fan section 77 or information regarding the air flow rate such as information measured by an air flow sensor (S101). After that, the impact application section 100 assesses whether the image projection section 5 is in operation or not on the basis of information regarding the air flow rate (S103). In a case where the image projection section 5 is in operation (S103: Yes), the impact application section 100 sums up the operating times of the image projection section 5 (S105), and returns to the step of acquiring information regarding the air flow rate of S101.

On the other hand, in a case where the image projection section 5 is not in operation (S103: No), the impact application section 100 further assesses whether the summed-up operating time of the image projection section 5 has exceeded a threshold or not (S107). In a case where the summed-up operating time of the image projection section 5 exceeds the threshold (S107: Yes), the impact application section 100 strikes the filter section 300 by means of the striking section 120, and performs a dust removal operation that shakes off dust accumulated in the filter section 300 (S109). After that, the impact application section 100 resets the summed-up operating time of the image projection section 5 (S111). On the other hand, in a case where the summed-up operating time of the image projection section 5 does not exceed the threshold (S107: No), the impact application section 100 ends the operation.

The number of times of striking of the filter section 300 by the impact application section 100 during the dust removal operation is at least two or more, and the upper limit is not particularly limited. For example, the number of times of striking of the filter section 300 by the impact application section 100 may be ten. Further, the impact application section 100 measures the mass of the filter section 300 by means of an acceleration sensor, a mass sensor, or the like provided in the filter section 300, and may use the measured mass of the filter section 300 to assess the number of times of striking by which sufficient dust removal is performed.

By such an operation, the impact application section 100 can periodically remove dust accumulated in the filter section 300 by striking the filter section 300 when the image projection section 5 has operated for a time exceeding the threshold.

Further, by performing the dust removal operation at a timing when the image projection section 5 does not operate, the impact application section 100 can, for example, prevent a situation where the dust removal operation is performed when a user is visually identifying an image. Further, since the impact application section 100 performs the dust removal operation after dust is accumulated to some degree in the filter section 300, the impact application section 100 can remove dust from the filter section 300 more efficiently.

Note that, although in the above the timing when the impact application section 100 starts the dust removal operation is assessed from the summed-up operating time of the image projection section 5, the technology according to the present disclosure is not limited to the example mentioned above. For example, the impact application section 100 may assess whether to perform the dust removal operation of the filter section 300 or not by assessing the degree of clogging of the filter 310 from the rotation rate of the fan section 77, the air flow rate detected by an air flow sensor provided in the fan section 77, etc. Further, the impact application section 100 may assess whether to perform the dust removal operation of the filter section 300 or not by assessing the amount of dust accumulated in the filter section 300 on the basis of the mass of the filter 310 detected by an acceleration sensor, a mass sensor, or the like provided in the filter section 300.

5. CONCLUSIONS

As described hereinabove, by the projection-type image display apparatus 1 according to an embodiment of the present disclosure, a larger impact can be applied to the filter section 300, and therefore dust accumulated in the filter section 300 can be removed more efficiently. Therefore, by the projection-type image display apparatus 1 according to the present embodiment, the frequency of maintenance such as filter exchange can be suppressed. In particular, in a case where the projection-type image display apparatus 1 is hung from a ceiling or the like, the frequency of maintenance, which requires time and effort, can be suppressed, and therefore the technology according to the present disclosure can be used more favorably.

Note that the technology according to the present disclosure is not limited to the projection-type image display apparatus 1, and may be used for other apparatuses equipped with a filter. For example, the technology according to the present disclosure may also be used for the cleaning of filters installed in air-conditioning apparatus such as air conditioners and air cleaners.

Although the above description is given by showing a projection-type image display apparatus as an embodiment of the present disclosure, the embodiment of the technology according to the present disclosure is not limited to this example. For example, as another embodiment of the present disclosure, a filter apparatus, and a control apparatus and a control method that control striking on a filter may be given as an example. According to such an embodiment, the technology according to the present disclosure can be applied also to air-conditioning apparatuses such as air conditioners and air cleaners described above.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A projection-type image display apparatus including:

an image projection section configured to generate and project an image;

a cabinet section that houses the image projection section in an interior and is provided with at least one or more air inlets;

a passage section through which outside air taken in from the air inlet flows;

a filter section provided in the passage section;

an impact application section configured to strike the filter section; and a control section configured to control the impact application section so as to strike the filter section at a timing when the filter section vibrating by striking of the impact application section is moving toward the impact application section.

(2)

The projection-type image display apparatus according to (1), in which a period of striking by the impact application section is longer than a time from when the impact application section is instructed to perform striking to when the impact application section comes into contact with the filter section.

(3)

The projection-type image display apparatus according to (1) or (2), in which a period of striking by the impact application section is longer than an interval with which the impact application section is operable continuously.

(4)

The projection-type image display apparatus according to any one of (1) to (3), in which the impact application section strikes the filter section at a timing when the filter section is moving at a speed higher than a prescribed speed.

(5)

The projection-type image display apparatus according to any one of (1) to (4), in which the filter section is provided in the passage section via an elastic member.

(6)

The projection-type image display apparatus according to any one of (1) to (5), in which the filter section includes a filter configured to collect dust, and a frame that holds the filter, and the impact application section strikes the frame of the filter section.

(7)

The projection-type image display apparatus according to any one of (1) to (6), in which striking by the impact application section is performed when the image projection section does not operate.

(8)

The projection-type image display apparatus according to any one of (1) to (7), in which striking by the impact application section is performed on the basis of a summed-up operating time of the image projection section.

(9)

The projection-type image display apparatus according to any one of (1) to (8), in which a period of striking by the impact application section varies on the basis of a summed-up operating time of the image projection section.

(10)

The projection-type image display apparatus according to any one of (1) to (9), in which a period of striking by the impact application section varies on the basis of a state of the filter section.

(11)

The projection-type image display apparatus according to any one of (1) to (10), in which the impact application section strikes the filter section by reciprocal motion by a solenoid actuator.

(12)

A filter apparatus including:

a filter section;

an impact application section configured to strike the filter section; and a control section configured to control the impact application section so as to strike the filter section at a timing when the filter section vibrating by striking of the impact application section is moving toward the impact application section.

(13)

A control apparatus including:

a control section configured to control an impact application section configured to strike a filter section provided in a projection-type image display apparatus so as to strike the filter section at a timing when the filter section is moving toward the impact application section.

(14)

A control method including:

controlling an impact application section so as to strike a filter section provided in a projection-type image display apparatus; and controlling the impact application section by an arithmetic processing apparatus so as to strike the filter section at a timing when the filter section vibrating by striking of the impact application section is moving toward the impact application section.

REFERENCE SIGNS LIST 1 projection-type image display apparatus
3 cabinet section
5 image projection section
7, 9 opening
71, 73 separating wall
75 passage section
77 fan section
100 impact application section
110 driving section
120 striking section
130 control board
131 power source section
133 control section

The invention claimed is:

1. A projection-type image display apparatus, comprising:
an image projection section configured to generate and project an image;
a cabinet section that houses the image projection section in an interior of the cabinet section,
wherein the cabinet section includes at least one air inlet configured to receive outside air;
a passage section through which the outside air flows inside the cabinet section;
a filter section in the passage section;
an impact application section configured to strike the filter section; and
a control section configured to:
generate, at a first time, a control signal to control the impact application section;
control, based on the control signal, the impact application section to strike the filter section at a second time,
wherein the filter section is configured to vibrate based on the strike of the filter section at the second time; and
control the impact application section to strike the filter section at a third time, wherein
at the third time, a movement of the filter section is toward the impact application section,
the strike of the filter section at the third time is subsequent to the strike of the filter section at the second time, and
a first time period between the second time and the third time varies based on a state of the filter section.

2. The projection-type image display apparatus according to claim 1, wherein the first time period between the second time and the third time is longer than a second time period between the first time and the second time.

3. The projection-type image display apparatus according to claim 1, wherein the first time period between the second time and the third time is longer than an interval with which the impact application section is operable continuously.

4. The projection-type image display apparatus according to claim 1, wherein at the third time, a speed of the movement of the filter section is higher than a threshold speed.

5. The projection-type image display apparatus according to claim 1, further comprises an elastic member in the passage section, wherein the elastic member is in contact with the filter section.

6. The projection-type image display apparatus according to claim 1, wherein
the filter section includes:
a filter configured to collect dust, and
a frame that holds the filter, and
the impact application section is further configured to strike the frame of the filter section.

7. The projection-type image display apparatus according to claim 1, wherein the impact application section is further configured to strike the filter section based on the image projection section that is inoperable.

8. The projection-type image display apparatus according to claim 1, wherein
the impact application section is further configured to strike the filter section based on a summed-up operating time of the image projection section, and
the summed-up operating time corresponds to a time duration associated with an operation of the image projection section.

9. The projection-type image display apparatus according to claim 8, wherein the first time period between the second time and the third time varies based on the summed-up operating time of the image projection section.

10. The projection-type image display apparatus according to claim 1, wherein the impact application section is further configured to strike the filter section based on a reciprocal motion by a solenoid actuator.

11. A filter apparatus, comprising:
a filter section;
an impact application section configured to strike the filter section; and
a control section configured to:
generate, at a first time, a control signal to control the impact application section;
control, based on the control signal, the impact application section to strike the filter section at a second time,
wherein the filter section is configured to vibrate based on the strike of the filter section at the second time; and
control the impact application section to strike the filter section at a third time wherein
at the third time, a movement of the filter section is toward the impact application section,
the strike of the filter section at the third time is subsequent to the strike of the filter section at the second time, and
a time period between the second time and the third time varies based on a state of the filter section.

12. A control apparatus, comprising:
a control section configured to:
generate, at a first time, a control signal to control an impact application section of a projection-type image display apparatus;
control, based on the control signal, the impact application section to strike a filter section of the projection-type image display apparatus at a second time,
wherein the filter section vibrates based on the strike of the filter section at the second time; and
control the impact application section to strike the filter section at a third time, wherein
at the third time, a movement of the filter section is toward the impact application section,
the strike of the filter section at the third time is subsequent to the strike of the filter section at the second time, and
a time period between the second time and the third time varies based on a state of the filter section.

13. A control method, comprising:
generating, at a first time, a control signal to control an impact application section of a projection-type image display apparatus;
controlling, based on the control signal, the impact application section to strike a filter section of the projection-type image display apparatus at a second time,
wherein the filter section vibrates based on the first strike of the filter section at the second time; and
controlling the impact application section to strike the filter section at a third time, wherein
at the third time, a movement of the filter section is toward the impact application section,
the strike of the filter section at the third time is subsequent to the strike of the filter section at the second time, and
a time period between the second time and the third time varies based on a state of the filter section.

* * * * *